(12) United States Patent
Johnson et al.

(10) Patent No.: US 7,905,259 B2
(45) Date of Patent: Mar. 15, 2011

(54) ADVANCED CARBON DIOXIDE FUEL TANK INERTING SYSTEM

(75) Inventors: Russell W. Johnson, Elmhurst, IL (US); Rehan Zaki, Naperville, IL (US); Stephen F. Yates, Arlington Heights, IL (US)

(73) Assignee: Honeywell International Inc., Morristown, NJ (US)

( * ) Notice: Subject to any disclaimer, the term of this patent is extended or adjusted under 35 U.S.C. 154(b) by 1340 days.

(21) Appl. No.: 11/560,290

(22) Filed: Nov. 15, 2006

(65) Prior Publication Data

US 2008/0128048 A1   Jun. 5, 2008

(51) Int. Cl.
*B65B 31/00* (2006.01)

(52) U.S. Cl. .......... 141/64; 141/5; 141/45; 169/62; 220/88.3; 252/605

(58) Field of Classification Search .......... 141/4, 5, 141/37, 44, 45, 63, 64, 98, 285; 169/5, 9, 169/26, 62; 220/88.3; 137/209; 252/605
See application file for complete search history.

(56) References Cited

U.S. PATENT DOCUMENTS

| | | | |
|---|---|---|---|
| 3,777,928 A * | 12/1973 | Kober .......... | 220/88.3 |
| 3,847,298 A * | 11/1974 | Hamilton .......... | 220/88.3 |
| 5,803,136 A | 9/1998 | Hartsell, Jr. | |
| 5,918,679 A * | 7/1999 | Cramer .......... | 169/45 |
| 6,182,714 B1 | 2/2001 | Ginsburgh et al. | |
| 6,512,147 B2 * | 1/2003 | Inaba et al. .......... | 568/650 |
| 7,429,373 B2 * | 9/2008 | Pez et al. .......... | 423/652 |
| 2002/0088168 A1 | 7/2002 | Tichenor et al. | |
| 2002/0131907 A1 * | 9/2002 | Iwasaki .......... | 422/110 |
| 2004/0163826 A1 | 8/2004 | Spring | |
| 2005/0097819 A1 * | 5/2005 | Lomax et al. .......... | 48/127.9 |
| 2007/0041894 A1 * | 2/2007 | Drnevich .......... | 423/650 |

FOREIGN PATENT DOCUMENTS

EP   0867367 A2   9/1998
GB   1039361   8/1966

OTHER PUBLICATIONS

Santosh Y. Limaye, "Phyre Technologies, Next Generation OBIGGS: Developments at Phyre Technologies"; PowerPoint presentation found on the web at www.fire.tc.faa.gov/ppt/systems/; dated Nov. 2, 2005; Atlantic City, NJ, USA.

* cited by examiner

*Primary Examiner* — Timothy L Maust
*Assistant Examiner* — Jason K Niesz
(74) *Attorney, Agent, or Firm* — Oral Caglar, Esq.

(57) ABSTRACT

An onboard inert gas generation system includes an evaporator comprising a vessel that receives a hydrocarbon fuel from a fuel tank, separates vapor fuel components from liquid fuel components, establishes a nearly constant fuel vapor composition, and outputs the fuel vapor to be mixed with air prior to combusting the fuel vapor and air mixture in a catalytic reactor. Water is separated from the inert gas produced and the inert gas is introduced into the ullage space of the fuel tank to prevent or reduce possible hazardous conditions in the fuel tank.

18 Claims, 3 Drawing Sheets

ADVANCED CARBON DIOXIDE FUEL TANK INERTING SYSTEM

BACKGROUND OF THE INVENTION

The present invention generally relates to hydrocarbon fuel tank safety systems and, more particularly, to maintaining inert gas in the ullage space of a fuel tank containing a hydrocarbon fuel such as aviation jet fuel.

The combination of fuel vapor and air existing in fuel tank ullage space (empty space above the fuel) can represent a significant safety hazard. For example, the National Transportation Safety Board concluded that the probable cause of the loss in 1996 of TWA flight 800 with all passengers and crew was an explosion of the center wing fuel tank, resulting from ignition of the flammable fuel/air mixture in the tank. The fuel vapor suddenly reacted with great violence with the oxygen present in the ullage space. The FAA report concluded that this type of accident represents a serious threat and that fuel tank inerting should be used to prevent future events of this type.

One approach to fuel tank inerting is to introduce nitrogen gas into the ullage space of the fuel tank. Nitrogen gas does not support fuel vapor oxidation and represents the current best method for on-board generation of an inert gas. Nitrogen can be separated from air using either membrane pressure swing adsorption (PSA) or temperature swing adsorption (TSA). Although these nitrogen fuel tank inerting systems require the consumption of energy to function, they do provide an adequate approach to fuel tank inerting.

Carbon dioxide can also be used to provide fuel tank inerting. Carbon dioxide can easily be generated by reacting a small amount of fuel with oxygen in an air stream, and then removing water that is co-generated. U.S. Pat. No. 3,847,298 to Hamilton teaches a method for generating an inert gas using catalytic combustion of fuel to form carbon dioxide. The liquid jet fuel used in aviation, however, typically contains a substantial amount of sulfur-containing components, which can lead, for example, to problems such as corrosion of metal components in the inerting system.

Another system for carbon dioxide generation is disclosed by Y. Limaye, on the Internet at www.fire.tc.faa.gov/ppt/systems/20051102_FAA_OBIGGS_ Presentation_condensed.ppt, (Phyre Technologies, dated Nov. 2, 2005). The system disclosed by Phyre Technologies uses fuel vapor in the fuel tank ullage space to provide both the oxygen and fuel vapor required for carbon dioxide generation. The low boiling (vapor fraction) of the fuel may contain a lower sulfur concentration compared to the method of Hamilton. The lower sulfur concentration can reduce impact of sulfur dioxide and sulfur trioxide byproducts on the system components.

Jet fuel has a very low vapor pressure, however, at some of the conditions leading to low temperatures encountered in the fuel tank of aircraft. In particular the temperature in the fuel tank may be very low during descent after a long cruise at high altitude. The small amount of fuel in the vapor phase in the ullage space during such a time would provide a very low potential for carbon dioxide generation.

As can be seen, there is a need for fuel tank inerting for aircraft safety. There is a need for fuel tank inerting that consumes a minimal amount of energy yet provides reliable generation of inert gases and that mitigates impact of sulfur byproducts on the operation of the fuel tank inerting.

SUMMARY OF THE INVENTION

In one embodiment of the present invention, an onboard inert gas generation system includes an evaporator that comprises a vessel that receives a hydrocarbon fuel from a fuel line, separates vapor fuel components from liquid fuel components, establishes a nearly constant fuel vapor composition, and outputs a fuel vapor through a vapor line.

In another embodiment of the present invention, an aircraft fuel system comprises a fuel valve that meters fuel; a fuel heater that heats the metered fuel from the fuel valve; an evaporator that receives the metered, heated fuel and provides a fuel vapor having a nearly constant fuel vapor composition; a mixing tee that mixes the fuel vapor with air; and a catalytic reactor that reacts the fuel vapor and air mixture to produce an inert gas.

In still another embodiment of the present invention, a method for fuel tank inerting comprises the steps of: evaporating a fraction of liquid fuel into a fuel vapor; combusting the fuel vapor with air in a reactor to form an inert gas; and introducing the inert gas into an ullage space of the fuel tank.

These and other features, aspects and advantages of the present invention will become better understood with reference to the following drawings, description and claims.

DETAILED DESCRIPTION OF THE INVENTION

Figure 1:
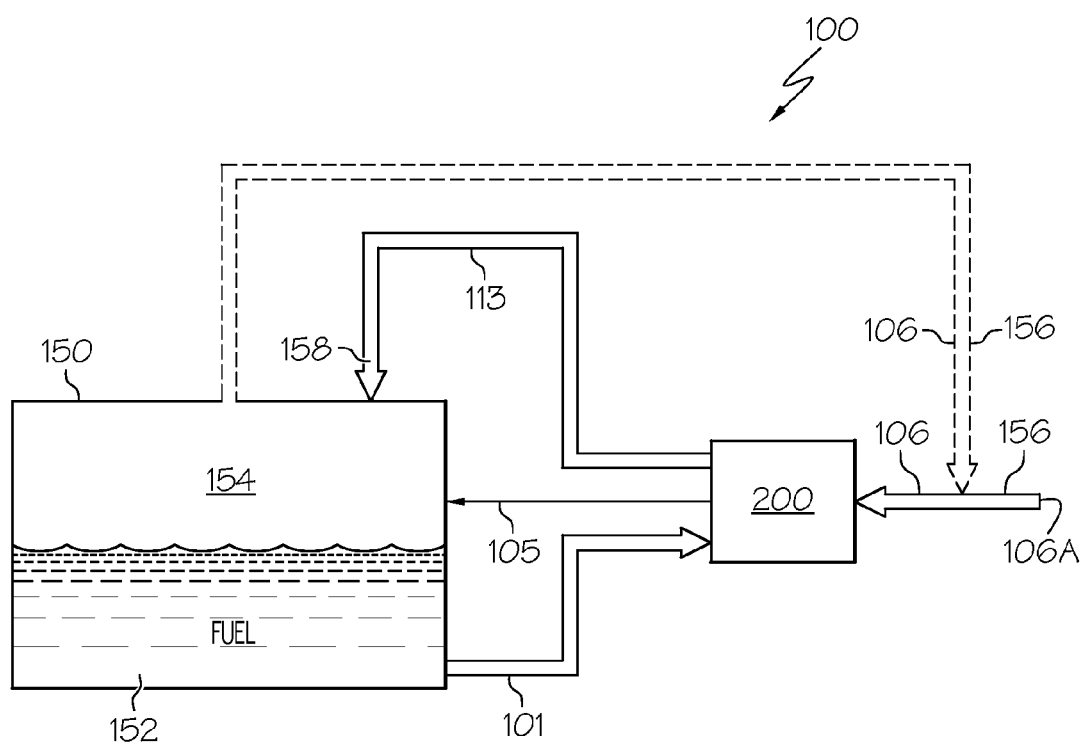
FIG. 1 is a system block diagram of a fuel tank and fuel tank inerting system in accordance with one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, embodiments of the present invention provide fuel tank inerting systems and methods for maintaining an inert, i.e., non-flammable, gas in the ullage space of a fuel tank containing a hydrocarbon fuel such as aviation jet fuel. Embodiments may be especially useful for commercial and military aircraft, and may also be applicable to fuel tanks for any type of vehicle—such as automobiles, trucks, and ships—where fire safety may be of concern. Embodiments of the present invention may exhibit the following operating principles: a) Fuel vapor generally is not explosive under conditions found in an aircraft in a volume in which the concentration of oxygen is less than 12%; b) Carbon dioxide may be generated by the following chemical reaction: $C_nH_m + (n+0.25\ m)O_2 \rightarrow n\ CO_2 + 0.5\ m\ H_2O$; and c) The energy required to vaporize fuel can be obtained from oxidation of the resulting fuel vapor.

Prior art inert gas generation systems typically either provide fuel (liquid phase) and air directly to a reactor for combustion or, for example, mix fuel and air in a mixing chamber prior to providing the fuel-air mixture to a reactor. Another prior art approach, for example, is to use fuel vapor in the fuel tank ullage space to provide both the oxygen and fuel vapor required for carbon dioxide generation. In contrast to these prior art examples, an embodiment of the present invention may incorporate an evaporator (also referred to as a "flash drum"). The evaporator, according to embodiments of the present invention, may provide a constant and controlled flow of fuel vapor prior to mixing with air and prior to combustion, so that the constant and controlled amount of fuel vapor can be converted into carbon dioxide using a relatively lower-boiling fraction of the jet fuel, in contrast to the prior art. The low-boiling vapor fraction of the fuel in embodiments of the present invention may contain a lower sulfur concentration compared to the prior art and may contain less sulfur than, as in the prior art, if the entire contents of the liquid fuel stream were used.

The controlled, constant amount of fuel vapor in embodiments of the present invention contrasts to prior art systems without an evaporator that use fuel vapor in the fuel tank ullage space to provide both the oxygen and fuel vapor required for carbon dioxide generation and encounter variations in vapor pressure with changes in temperature and other flight conditions.

In an exemplary embodiment of the present invention, the fuel tank ullage space may be the source of air (while the evaporator may be the source of fuel vapor) to be used for catalytic combustion. This fuel tank ullage space source of air, under some conditions, may contain enough hydrocarbon fuel vapor to provide an adequate carbon dioxide concentration. In contrast to prior art systems that use fuel vapor in the fuel tank ullage space to provide both the oxygen and fuel vapor, however, embodiments of the present invention can generate a quantity of carbon dioxide to provide adequate carbon dioxide concentration for inerting the fuel tank ullage space even when the vapor pressure of the fuel is very low, as under conditions of very low ambient temperature. In addition, other sources of air such as ram air, engine bleed air, or cabin air may be used by embodiments of the present invention to provide some or all of the oxygen required for catalytic reaction.

FIG. 1 illustrates system 100 which may comprise part of an aircraft fuel storage and delivery system. Fuel system 100 may include a fuel tank inerting system 200, which may also be referred to as an onboard inert gas generation system (OBIGGS). Fuel system 100 may include a fuel tank 150, a portion of the volume of which may contain fuel 152 and another portion of the volume of which, the ullage space 154 may contain fuel vapor, for example, or a combination of fuel vapor and air or other gases. Fuel 152 may be, for example, a hydrocarbon fuel, such as aviation jet fuel, kerosene, diesel, or gasoline.

Fuel system 100 may include a fuel line 101 for delivery of fuel 152 to inerting system 200 and a fuel return line 105 for return of fuel 152 from inerting system 200 to tank 150 as indicated by the directional arrows in FIG. 1. Return line 105 may be used, for example, to return unused fuel from inerting system 200 to fuel tank 150 or to relieve fuel pressure in inerting system 200.

Fuel system 100 may include an air input line 106 for feeding air 156 (which may be any oxygen-containing gas) to inerting system 200. Air input line 106, as shown by the dashed line in FIG. 1, may feed air 156 from the ullage space 154 to inerting system 200. Additional or alternative sources of air 156 also may be connected, for example, to air input line 106 at inlet 106A. Such alternative sources may include, for example, ram air (e.g., air from outside an aircraft or vehicle), engine bleed air, or cabin air.

Fuel system 100 may include an inert gas line 113 for output of inert gas 158 from inerting system 200 to fuel tank 150. Inert gas line 113 may introduce a quantity of inert gas 158—such as carbon dioxide—into the fuel tank ullage space 154, thus reducing the concentration of oxygen in the volume occupied by ullage space 154. As known in the art, fuel vapor may not be explosive under conditions found in a volume in which the concentration of oxygen is less than approximately 12%. Thus, by replacing some of the oxygen from ullage space 154 with carbon dioxide (e.g., inert gas 158) to reduce the concentration of oxygen in ullage space 154, inerting system 200 may provide an important safety function of preventing fuel tank explosion to an aircraft or other vehicle in which inerting system 200 is employed.

Figure 2:
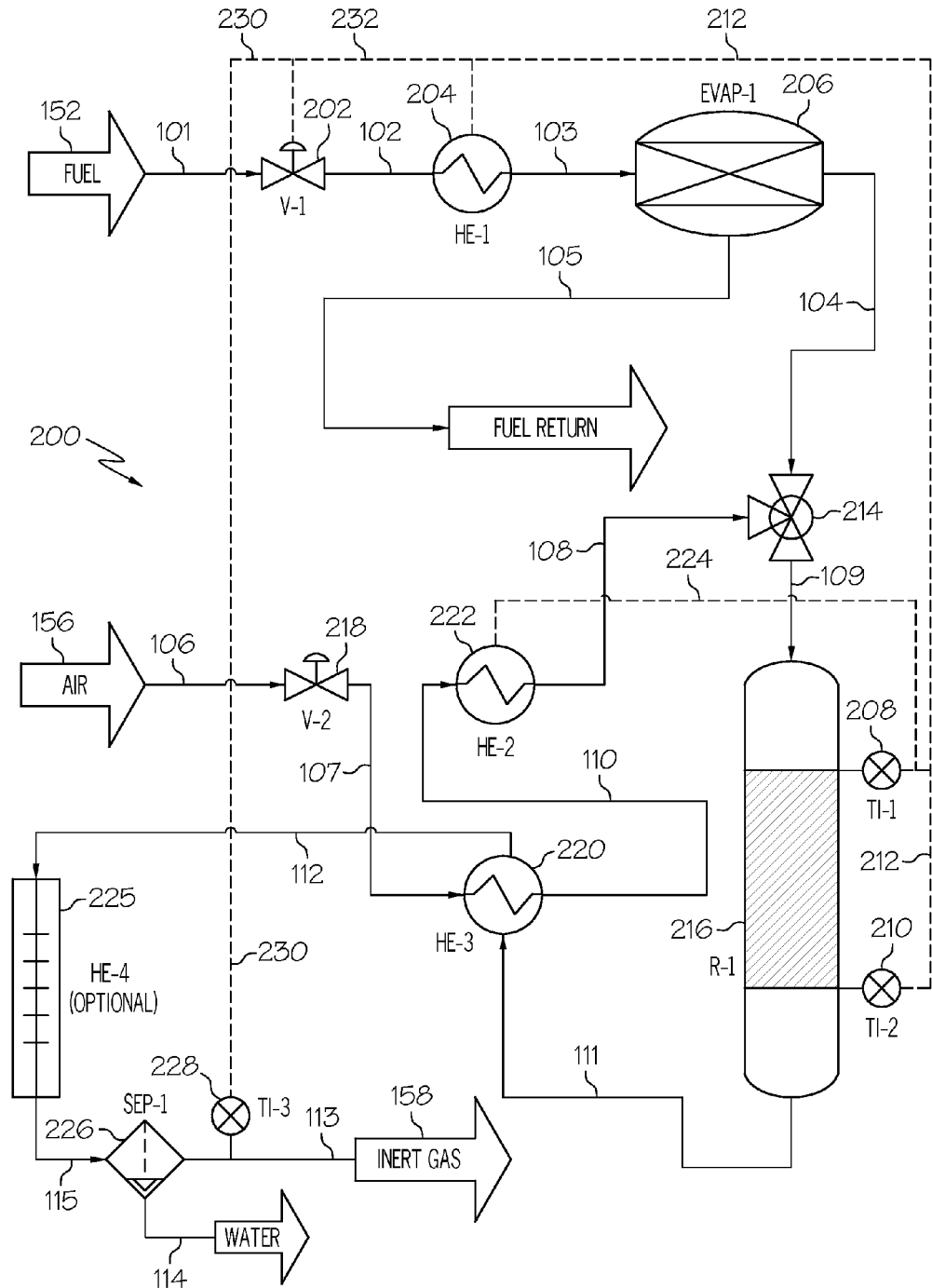
FIG. 2 is a schematic diagram of a fuel tank inerting system in accordance with one embodiment of the present invention.

FIG. 2 illustrates exemplary fuel tank inerting system 200 in accordance with one embodiment of the present invention. For example, inerting system 200 may be connected as shown in FIG. 1 to the fuel system 100 of a vehicle such as an aircraft. Fuel 152 may be taken from the discharge side of a fuel pump (not shown) connected in fuel line 101, fed through fuel line 101, and metered through fuel control valve 202 (labeled also as V-1 in FIG. 2). The fuel control valve 202 may control the flow of fuel 152 from the fuel tank 150, through fuel line 101 (e.g., using a fuel transfer pump) and eventually to the evaporator 206. The fuel flow rate of fuel 152 to evaporator 206 may be metered by fuel control valve 202 to provide sufficient fuel 152 to the evaporator 206 to provide adequate vaporization of fuel 152. Adequate vaporization may be determined, for example, by the amount of inert gas 158 generated at inert gas line 113 compared to the amount needed to provide an oxygen concentration less than a pre-determined level—for example 12%—in fuel tank ullage space 154.

Fuel 152 may be passed from fuel control valve 202 through fuel line 102 to fuel heater 204 (which may be a heat exchanger, also labeled as HE-1 in FIG. 2). Fuel 152 may be heated in fuel heater 204. Fuel heater 204 may be used to elevate the temperature of the liquid fuel 152 to a temperature sufficient for providing a controlled hydrocarbon partial pressure (e.g., using evaporator 206) for generating the carbon dioxide (e.g., in reactor 216) that is used for inerting, i.e., providing inert gas 158 to ullage space 154. In an exemplary embodiment, the fuel heater 204 may provide a controlled amount of heat to the liquid fuel 152, being controlled, for example, by the difference in temperature between a reactor inlet temperature indicator 208 (labeled TI-1) and a reactor outlet temperature indicator 210 (labeled TI-2) as indicated by (dashed) control line 212 in FIG. 2. Fuel heater 204 may use electrical energy, for example, to heat the liquid fuel 152. In an alternative embodiment, the fuel heater 204 may use hot air in a heat exchanger to heat fuel 152. The fuel heater 204 may be designed to be capable (e.g., to have enough heating capacity) of controlling the temperature of either the liquid fuel or vapor fuel in the evaporator 206.

Fuel 152 may be conducted from fuel heater 204 through fuel line 103 to an evaporator 206 (also labeled as Evap-1 in FIG. 2). The evaporator may be a vessel which separates vapor fuel components from liquid fuel components and establishes a constant or nearly-constant fuel vapor composition. Thus, inerting system 200 may use only fuel from fuel tank 150 for vapor. A small fraction of the liquid fuel 152 may be vaporized in evaporator 206. For example, it may be neither necessary nor desirable that the evaporator 206 convert the entire liquid fuel 152 into vapor. For evaporator 206, it may be desirable that less than 25% of the fuel be converted into vapor, it may be more desirable that less than 10% of the fuel be converted into vapor, and it may be even more desirable that less than 5% of the fuel be converted into vapor. For example, a fuel vapor composition in which approximately 10% of the fuel is converted into vapor may be considered "nearly constant" if between 12% and 8% of the fuel is converted into vapor, e.g., plus or minus 20%. The vessel of evaporator 206 may be configured to provide residence time of liquid fuel 152 and surface area of the vessel adequate to establish vapor-liquid equilibrium. The remaining liquid fraction of the fuel 152 may be drained from the evaporator 206 and returned through fuel return line 105 to the fuel tank 150. The vapor phase of fuel 152 from evaporator 206 may be conducted through vapor line 104 to a mixing tee 214.

The vapor phase of fuel 152 from evaporator 206 in vapor line 104 may be combined at mixing tee 214 with an air stream in air line 108 to provide an air/fuel vapor mixture through mixture line 109 to catalytic reactor 216. The air stream in air line 108 may be air 156 collected from a bleed air or compressor source, e.g., connected at inlet 106A, fed through air input line 106 to air control valve 218 (labeled also as V-2). The air control valve 218 may control the flow of air that eventually reaches mixing tee 214 as the air stream in line 108. The air flow rate of air stream in line 108 may be metered by air control valve 218 to provide sufficient air along with the vapor phase of fuel 152 from evaporator 206 through mixing tee 214 to provide a specific quantity of inert gas 158 from reactor 216. The specific quantity may, for example, be an amount of inert gas 158 generated at inert gas line 113 equal or greater than the amount needed to provide an oxygen concentration less than a pre-determined level—for example, 12%—in fuel tank ullage space 154. A calculation of the temperature increase between input air 156 and output inert gas 158 may indicate a desirability that some or all of the input air 156 should be from the fuel tank ullage space 154. Input air 156 from ullage space 154 may be a mixture of air and carbon dioxide. Using input air 156 from ullage space 154 may readily provide an effective way to obtain a steady state oxygen concentration of approximately 12% in the fuel tank ullage space 154.

The air 156, metered by air control valve 218, may be conveyed through air line 107 to a recuperative heat exchanger 220 (labeled HE-3 and which may also be referred to as a "recuperator"). Recuperative heat exchanger 220 may transfer a fraction of the heat (e.g., heat generated by reacting the fuel) in effluent lines 111, 112 carrying the reactor 216 output effluent to the inlet air 156 in air lines 107, 110 and thereby reduce the energy input required by air heater 222 (also labeled HE-2). The transfer of heat from lines 111, 112 may also provide cooling to the oxygen-deficient air stream—i.e., the reactor 216 output effluent containing inert gas 158—before the inert gas 158 is reintroduced into the fuel tank 150.

The inlet air 156 in line 110 may be further heated by air heater 222 and conducted to the mixing tee 214 through line 108. The air heater 222 may elevate the temperature of the inlet air 156 to a temperature sufficient to provide a controlled hydrocarbon partial pressure to generate the carbon dioxide (e.g. inert gas 158) that is used for inerting. In an exemplary embodiment, the air heater 222 may provide a controlled amount of heat to inlet air 156 being controlled, for example, by reactor inlet temperature indicator 208 (TI-1) as indicated by (dashed) control line 224 in FIG. 2. Air heater 222 may use electrical energy, for example, to heat the inlet air 156. In an alternative embodiment, the air heater 222 may use hot air in a heat exchanger to heat inlet air 156. The air heater 222 may be designed (e.g., to have enough heating capacity) to control the temperature of inlet air 156 in inlet line 108 to the mixing tee 214.

Mixing tee 214 may mix the fuel vapor stream from vapor line 104 and the inlet air stream from air line 108 and provide a combined fuel vapor and air stream through mixture line 109 to catalytic reactor 216. The combined fuel vapor and air stream in mixture line 109 may have a composition well below the lower explosion limit of an air-fuel mixture. (The lower explosion limit, as known in the art, may refer to the volume fraction of hydrocarbon vapor being less than an amount which is a particular function of the volume fraction of oxygen in the vapor and gas mixture. For a mixture with volume fraction of hydrocarbon vapor above the lower explosion limit amount for the volume fraction of oxygen present, the mixture may be flammable.)

The catalytic reactor 216 may be comprised of a vessel filled or partially filled with a catalytic composition capable of oxidizing fuel 152 or a portion of fuel 152 to carbon dioxide. The catalytic reactor 216 may be loaded with an oxidation catalyst, and the catalytic composition may comprise, for example, platinum on alumina as known in the art. In reactor 216 (R-1) the admixture of air and fuel vapor from mixture line 109 may be contacted with a suitable catalyst, which may cause the fuel to be oxidized to carbon dioxide and water vapor. For example, carbon dioxide may be generated by the following chemical reaction: $C_nH_m+(n+0.25\,m)O_2 \rightarrow n\,CO_2+0.5\,m\,H_2O$. The catalytic reactor 216 may be operated at a sufficient temperature and space velocity to oxidize the (vaporized) fuel 152 into carbon dioxide and water vapor, preferably at a conversion greater than 90% of the fuel vapor; and more preferably greater than 98%.

The effluent from reactor 216, which may contain carbon dioxide and water, for example, may be conducted through effluent line 111, through recuperative heat exchanger 220 (HE-3). The recuperative heat exchanger 220 (HE-3) may provide cooling of the reactor effluent while heating the inlet air 156 in air lines 107, 110, as described above. The reactor effluent may be passed from recuperative heat exchanger 220, through effluent line 112, and through an optional secondary cooling heat exchanger 225 (HE-4). Secondary cooling heat exchanger 225 may be, for example, a finned tube, a cooled-liquid cooling stream contactor, or a ram-air cooler. Secondary cooling heat exchanger 225 may provide additional cooling capacity to further reduce the temperature of the reactor effluent stream before extracting water from the reactor effluent stream and conveying the inert gas 158 from the reactor effluent stream to the fuel tank 150.

The cooled reactor effluent may be fed through effluent line 115 to water separator 226 (Sep-1). The water separator 226 may remove condensed (liquid) water from the reactor effluent stream, draining the water through drain line 114 to avoid introducing water into the fuel tank 150, and leaving the carbon dioxide-rich inert gas 158 available for fuel tank inerting through line 113. In an alternative embodiment, water separator 226 could be placed, for example, at or near fuel tank 150 where line 113 connects to the ullage space 154 of the fuel tank 150.

Control of the reactor 216 operating conditions may be implemented using reactor inlet temperature indicator 208 (TI-1) and reactor outlet temperature indicator 210 (TI-2), which, for example, may be thermocouples providing an electrical signal corresponding to temperature to an electronic control system (not shown). For example, the amount of heat provided by air heater 222 (HE-2) to air 156 in air line 108 may be controlled by reactor inlet temperature indicator 208 (TI-1) as shown by (dashed) control line 224. If, for example, the reactor 216 input temperature is low, reactor inlet temperature indicator 208 may send a signal to increase the heat output of air heater 222, and conversely, if the reactor 216 input temperature is high, reactor inlet temperature indicator 208 may send a signal to decrease the heat output of air heater 222. The control 224 may be implemented directly between reactor inlet temperature indicator 208 and air heater 222, for example, or may be implemented as part of a more comprehensive overall control system for inerting system 200, which could be provided, for example, by computer processor type hardware executing a control program for inerting system 200.

Similarly, the amount of heat provided by fuel heater 204 (HE-1) to fuel 152 in fuel line 103 may be controlled by the difference in temperature between reactor inlet temperature indicator 208 (TI-1) and a reactor outlet temperature indicator 210 (TI-2) as shown by (dashed) control line 212. In turn the amount of heat provided by fuel heater 204 may control the amount of fuel that is vaporized in evaporator 206. If, for example, the reactor 216 output temperature is low, reactor outlet temperature indicator 210 may send a signal to increase the heat output of fuel heater 204, and conversely, if the reactor 216 output temperature is high, reactor outlet temperature indicator 210 may send a signal to decrease the heat output of fuel heater 204. Thus, the amount of fuel 152 vaporized may be controlled by the reactor outlet indicator 210 (TI-2). In general, fuel concentrations of less than 0.15 mole % in the mixture at mixture line 109 and a temperature rise between inlet temperature indicator 208 and outlet temperature indicator 210 of less than 300° F. (degrees Fahrenheit) may be desirable. The control 224 may be implemented directly between reactor outlet temperature indicator 210 and fuel heater 204, for example, or may be implemented as part of a more comprehensive overall control system for inerting system 200, which could be provided, for example, by computer processor type hardware executing a control program for inerting system 200.

A safety temperature indicator 228 (also labeled TI-3 in FIG. 2) may be positioned to prevent temperature for the fuel tank contents reaching too high a temperature. In general, this safety system may be designed to activate if the temperature shown by TI-3 exceeds about 150° F. The safety temperature indicator 228 may, for example, measure the temperature of the inert gas 158 in line 113. As indicated by control lines 230 and 232, a safety interlock may be provided to close fuel control valve 202 (V-1) if the temperature indicated by safety temperature indicator 228 (TI-3)—or reactor outlet temperature indicator 210 (TI-2)—exceeds a preset value. Control 230 or control 232, or their combination, may eliminate the possibility that heat produced by the inerting system 200 may overheat the fuel tank 150 contents, for example, by delivering inert gas 158 at too high of a temperature, and thereby cause a hazardous condition to exist.

Figure 3:
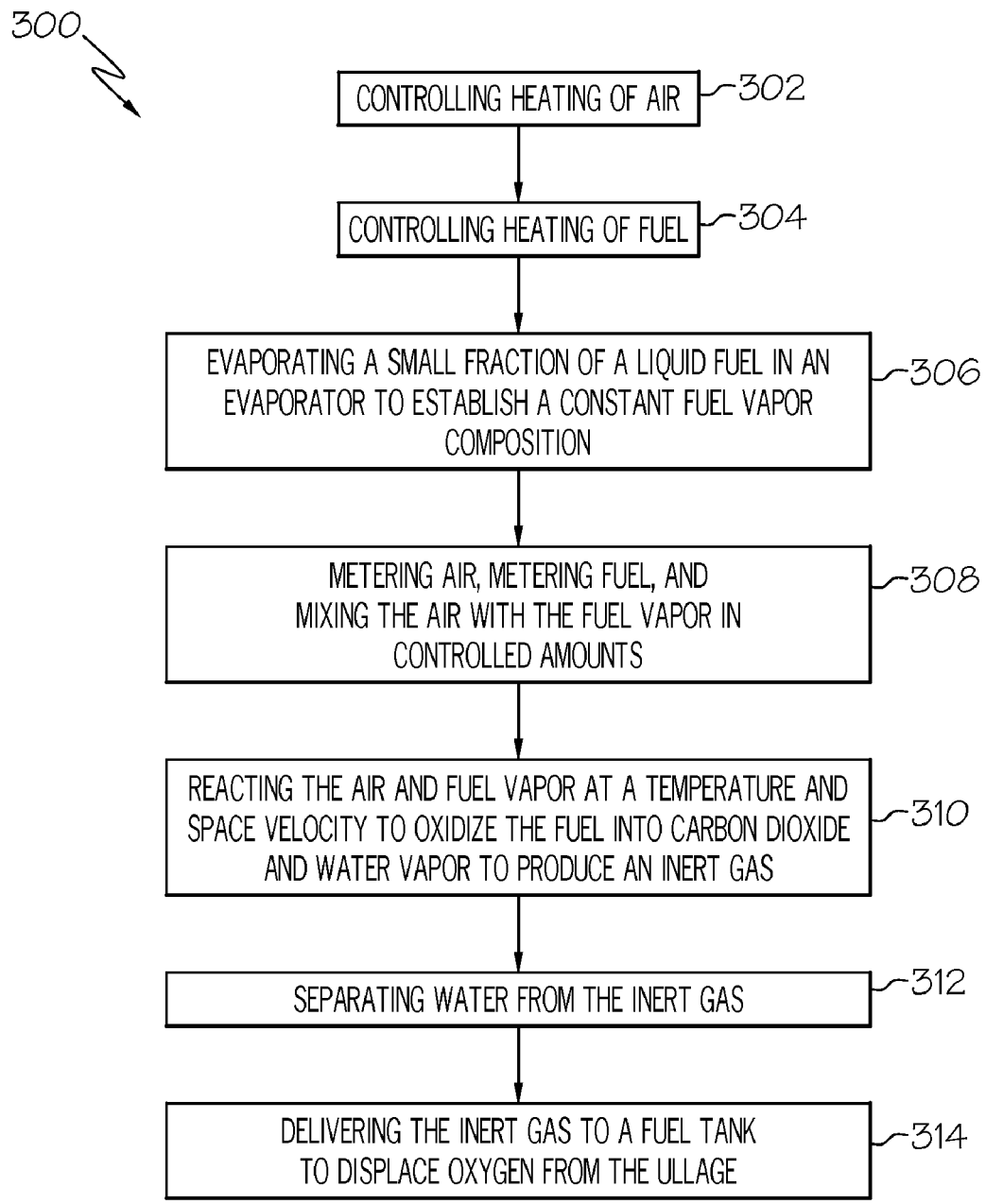
FIG. 3 is a flowchart for a method of fuel tank inerting in accordance with one embodiment of the present invention.

FIG. 3 illustrates a method 300 for fuel tank inerting in accordance with one embodiment of the present invention. Method 300 may include steps 302 and 304 for controlled heating of air and fuel. For example, at step 302, a reactor inlet temperature indicator 208 may be used to control an air heater 222 to heat input air 156. Also, for example, heat may be added by recuperative heat exchanger 220 from reactor effluent to heat input air 156. At step 304, for example, a reactor outlet temperature indicator 210 may be used to control a fuel heater 204 to heat fuel 152.

At step 306, an evaporator 206 may be used to evaporate a small fraction (e.g., less than 25% to less than 5%) of liquid fuel 152 to establish a constant (e.g., plus or minus 20%) fuel vapor composition in vapor line 104.

At step 308, air and fuel may be metered and air may be mixed with fuel vapor in controlled amounts to provide an air/fuel vapor mixture. Fuel control valve 202 may be used, for example, to meter fuel with control provided by a control system having inputs, for example, from reactor temperature indicators 208 and 210 and safety temperature indicator 228. Air control valve 218 may be used, for example, to meter air with control provided by a control system having inputs, for example, from reactor temperature indicators 208 and 210 and safety temperature indicator 228. The air/fuel vapor mixture may be provided, for example, from mixing tee 214 through mixture line 109 to a catalytic reactor 216.

A catalytic reactor 216 may be used, for example, at step 310 to combust the air and fuel vapor mixture at a temperature and space velocity that oxidizes the fuel into carbon dioxide and water vapor to produce an inert gas 158, e.g., carbon dioxide. Water may be separated from the inert gas 158 at step 312 by a water separator 226 to avoid introducing water into the fuel 152 in fuel tank 150. At step 314, inert gas 158 may be delivered to a fuel tank 150 to displace oxygen from the ullage space 154 of the fuel tank 150.

It should be understood, of course, that the foregoing relates to exemplary embodiments of the invention and that modifications may be made without departing from the spirit and scope of the invention as set forth in the following claims.

We claim:

1. An onboard inert gas generation system comprising:
   an evaporator that receives a quantity of liquid hydrocarbon fuel from a source of liquid fuel, separates a first portion of the quantity into vapor fuel components, leaves a second portion of the quantity as liquid fuel components, drains the second portion of the quantity through a fuel return line for return to the source of liquid fuel, establishes a nearly constant fuel vapor composition, and outputs the first portion of the quantity as fuel vapor through a vapor line; and
   a catalytic reactor that receives the output of fuel vapor from the vessel and an air input containing oxygen as reactive components.

2. The system of claim 1, wherein the first portion is less than 25% of the quantity of fuel received in the vessel.

3. The system of claim 1, wherein said nearly constant fuel vapor composition varies by no more than plus or minus 20%.

4. The system of claim 1, further comprising:
   a fuel heater that adds a controlled amount of heat to said fuel.

5. The system of claim 1, further comprising:
   an air heater that adds a controlled amount of heat to air in an air input line; and
   a mixing tee that receives the heated air and the fuel vapor and outputs a mixture of the heated air and the fuel vapor to a mixture line.

6. An aircraft fuel system comprising:
   a fuel valve that meters fuel;
   a fuel heater that heats the metered fuel from the fuel valve;
   an evaporator that receives the metered, heated fuel and provides a fuel vapor having a nearly constant fuel vapor composition;
   a mixing tee that mixes the fuel vapor with air;
   a catalytic reactor that reacts the fuel vapor and air mixture to produce an inert gas;
   an air valve that meters air;
   an air heater that heats the metered air fed from the air valve; and
   a reactor inlet temperature indicator that provides a first control signal to the air heater.

7. The system of claim 6, wherein the catalytic reactor operates at a sufficient temperature and space velocity to oxidize the fuel into carbon dioxide and water vapor at a conversion greater than 90% of the fuel vapor.

8. The system of claim 6, further comprising:
   a reactor outlet temperature indicator that provides a control signal to the fuel heater.

9. The system of claim 6, further comprising:
a reactor outlet temperature indicator that provides a second control signal to the fuel heater and the fuel valve; and
a safety temperature indicator that provides a third control signal to the fuel valve.

10. The system of claim 6, further comprising:
a recuperative heat exchanger that heats the metered air fed from the air valve using heat from the catalytic reactor.

11. The system of claim 6, further comprising:
a water separator that receives a reactor output effluent from the catalytic reactor and removes condensed water from the reactor output effluent and delivers the inert gas.

12. A method for fuel tank inerting, comprising the steps of:
introducing a quantity of liquid fuel from a fuel supply into an evaporator;
evaporating a first fraction of the quantity of the fuel into a fuel vapor;
draining a remaining fraction of the quantity of fuel, as a liquid, from the evaporator into the fuel supply;
combusting the fuel vapor with air in a reactor to form an inert gas; and
introducing the inert gas into an ullage space of the fuel tank.

13. The method of claim 12, further comprising:
metering a flow of liquid fuel into the evaporator in response to a control signal to control the fraction of fuel evaporated.

14. The method of claim 12, further comprising:
heating a flow of liquid fuel in response to a control signal to control the fraction of fuel evaporated.

15. The method of claim 12, further comprising:
heating an input air flow in response to a control signal before mixing the input air with the fuel vapor and feeding the fuel vapor with air to the reactor to control reactor operating conditions.

16. The method of claim 12, wherein:
the evaporating step uses only fuel from the fuel tank.

17. The method of claim 12, further comprising:
controlling the temperature of the inert gas using a safety temperature indicator.

18. The method of claim 12, wherein the step of evaporating the first fraction of the quantity of the fuel into a fuel vapor produces the fuel vapor with a first concentration of sulfur compounds smaller than a second concentration of sulfur compounds in the liquid fuel.

* * * * *